March 22, 1932. G. T. PARR 1,850,356
ICE CREAM CONTAINER
Original Filed June 25, 1923
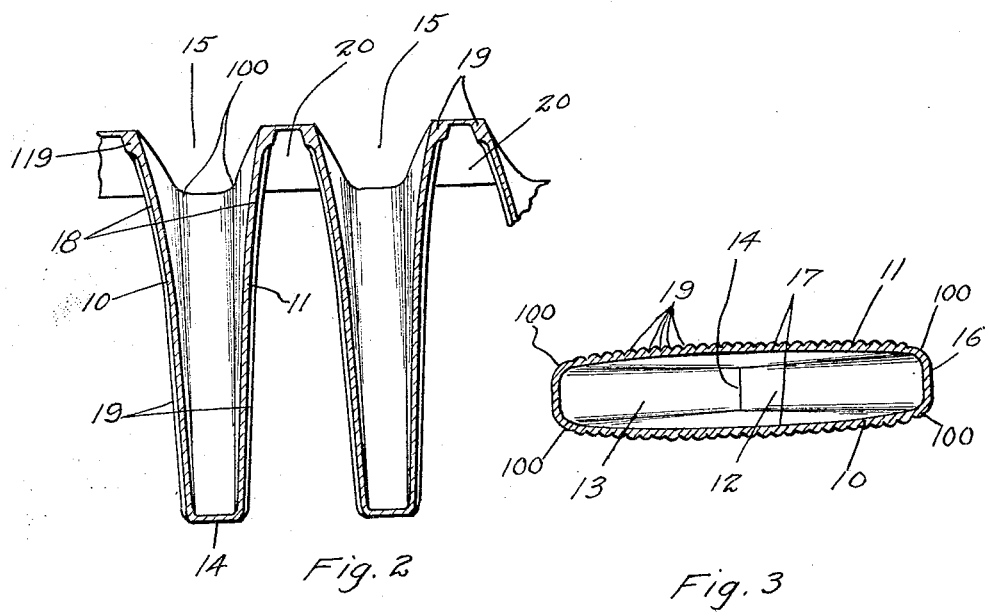
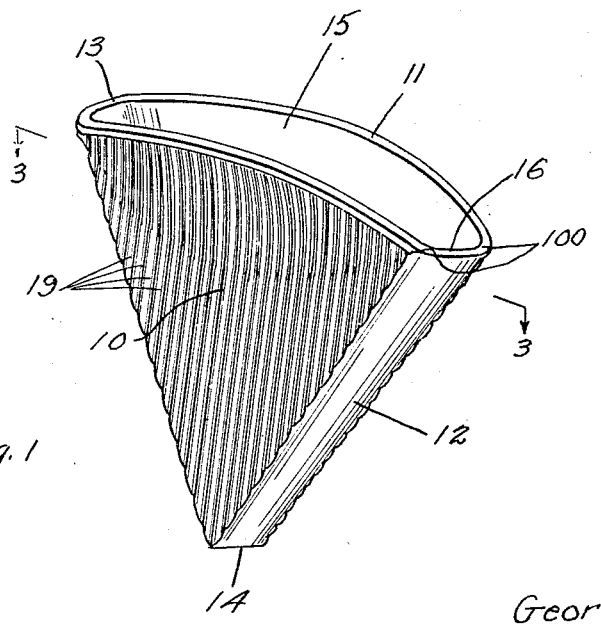
Inventor
George T. Parr
By Fischer Lagaard
Attorneys Patented Mar. 22, 1932

1,850,356

UNITED STATES PATENT OFFICE

GEORGE T. PARR, OF ST. PAUL, MINNESOTA

ICE CREAM CONTAINER

Application filed June 25, 1923, Serial No. 647,476. Renewed August 5, 1929.

My invention relates to edible ice cream containers and has for its object to provide an ice cream container which simulates the shape of a piece of pie which shall be open at its end and adapted to be filled with ice cream or any suitable filling through its open end.

Another object of the invention is to provide the sides of the container with longitudinal corrugations or other demarkations which, in the manufacture of the container, serve to cause the batter from which it is made to flow outwardly from the mould when the receptacle is baked and cause icing when applied to the container to readily adhere thereto.

A still further object is to form the sides of the container with an outwardly extending belly in a transverse direction and to cause the sides of said containers to diverge in a longitudinal direction so that a scoop for filling the receptacle may easily be inserted into the same.

A still further object is to provide the extreme edge of the receptacle with a bead or lip connecting all of the longitudinal corrugations whereby the receptacles are caused to break apart along the fins connecting the same after they are baked instead of through the walls of the container as might otherwise occur.

A still further object is to round the corners of the container so that the same will not readily break open.

The full objects and advantages of my invention will be found in the detailed description thereof and are particularly pointed out in the claim:

In the drawings illustrating my invention:

Figure 1 is a perspective view of one of my improved containers.

Figure 2 is a vertical sectional view taken through a number of containers before being separated.

Figure 3 is a sectional view taken on line 3—3 of Figure 1.

In the construction of ice cream receptacles having flat walls, considerable difficulty has been found in that the batter does not flow uniformly throughout the mould causing irregularities in the formation of the walls of the container. This matter I have overcome by providing a number of corrugations or other longitudinal demarkations which cause the batter to flow outwardly in a straight line thereby eliminating this difficulty. In addition, the flattened walls of the container have been found to curve inwardly and to partly close the opening into the container so that the scoop or other filling device could not be inserted into the same. This disadvantage I have overcome by bowing the cone outwardly in a transverse direction to stiffen the same and to prevent the cone from collapsing inwardly and, in addition, I have formed the cone with longitudinal diverging walls so that the opening into the container at all times remains larger than the interior space within the same.

My container, as best illustrated in Figure 1, consists of two side walls 10 and 11 shaped in the form of a segment of a circle, which walls are connected with two radially positioned walls 12 and 13 meeting at the apex of the container at 14 and leaving an opening 15 at the arcuate portion of the same. The walls 12 and 13 are made slightly tapering or wedge shaped so that the same are narrower at the point 14 than at the outer edge 16 of the same. These walls have rounded corners indicated at 100 to prevent the container from cracking and coming apart in said corners. The walls 10 and 11 are formed bowed, as indicated at 17 in Figure 3, transversely of the container and are further formed flaring in a longitudinal direction, as indicated at 18 in Figure 2.

In the construction of the containers, the same are formed within moulds or dies in which the batter is placed. These dies have male members adapted to be directed into the moulds which force the batter up through the mould and along the space between the said mould members to form the containers, as required. For forming a container of uniform texture throughout, I provide a number of longitudinal corrugations or other demarkations indicated at 19, which are arranged on the exterior surfaces of the side walls 10 and 11. The batter in being forced outwardly between the mould members flows along the lines running longitudinally of the container thereby causing the texture of the container to be the same throughout all portions thereof.

My improved container, when filled with ice cream, is eaten commencing at the arcuate open end of the same. As the container and ice cream within the same is eaten, the container is broken off as the same is bitten. When smooth flat walls are used with ice cream containers, the same do not break at the required places when a bite is taken of the confection but frequently go to pieces making the remainder of the container messy. By the use of the corrugations, the container is caused to break wherever bitten so that the container and contents are always intact until consumed.

In the formation of the containers, a number of containers are usually baked at a single time and the batter of the adjoining containers is united at the top by a thin fin, as indicated at 20 in Figure 2, where several containers have been shown attached together as actually occurs in the baking of the same. In severing the containers, it is simply necessary to break the same apart which it is desired to have occur at the fins 20. Where the walls of the containers are of the same thickness throughout, it frequently happens that, when the fins 20 are of substantial thickness, that the containers do not separate along the said fins but that the protruding portions of the walls 10 and 11 break thereby producing imperfect containers. To overcome this, I provide beads or lips 19 which extend along the arcuate portions of the walls 10 and 11, which beads are made thicker than the thickness of the said walls so that the fins 20 are caused to break along the said beads thereby severing the containers along said beads and producing containers with clean cut edges.

The advantages of my invention are manifest. A highly practical container is provided which may be readily and efficiently manufactured. After the container is completed, the same is provided with a substantial opening in which the ice cream may be inserted with a scoop or other means or if desired slices of ice cream may be directed into the container without the aid of a scoop. When it is desired to cover the container with chocolate or other icing, the corrugations or other demarkations cause the same to readily adhere thereto.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claim:

I claim:

An ice cream container formed of edible material comprising a pair of bowed side walls, end walls intersecting at one end connecting said side walls and defining an opening, said side walls having an outward flare adjacent said opening, a bead formed in said walls surrounding said opening and corrugations in certain of said walls strengthening the same and extending to said bead.

GEORGE T. PARR.